Jan. 2, 1962
E. A. EDBERG ET AL  3,015,479
MACHINE APPARATUS FOR MANUFACTURE OF FOAMED POLYSTYRENE
Filed June 23, 1955
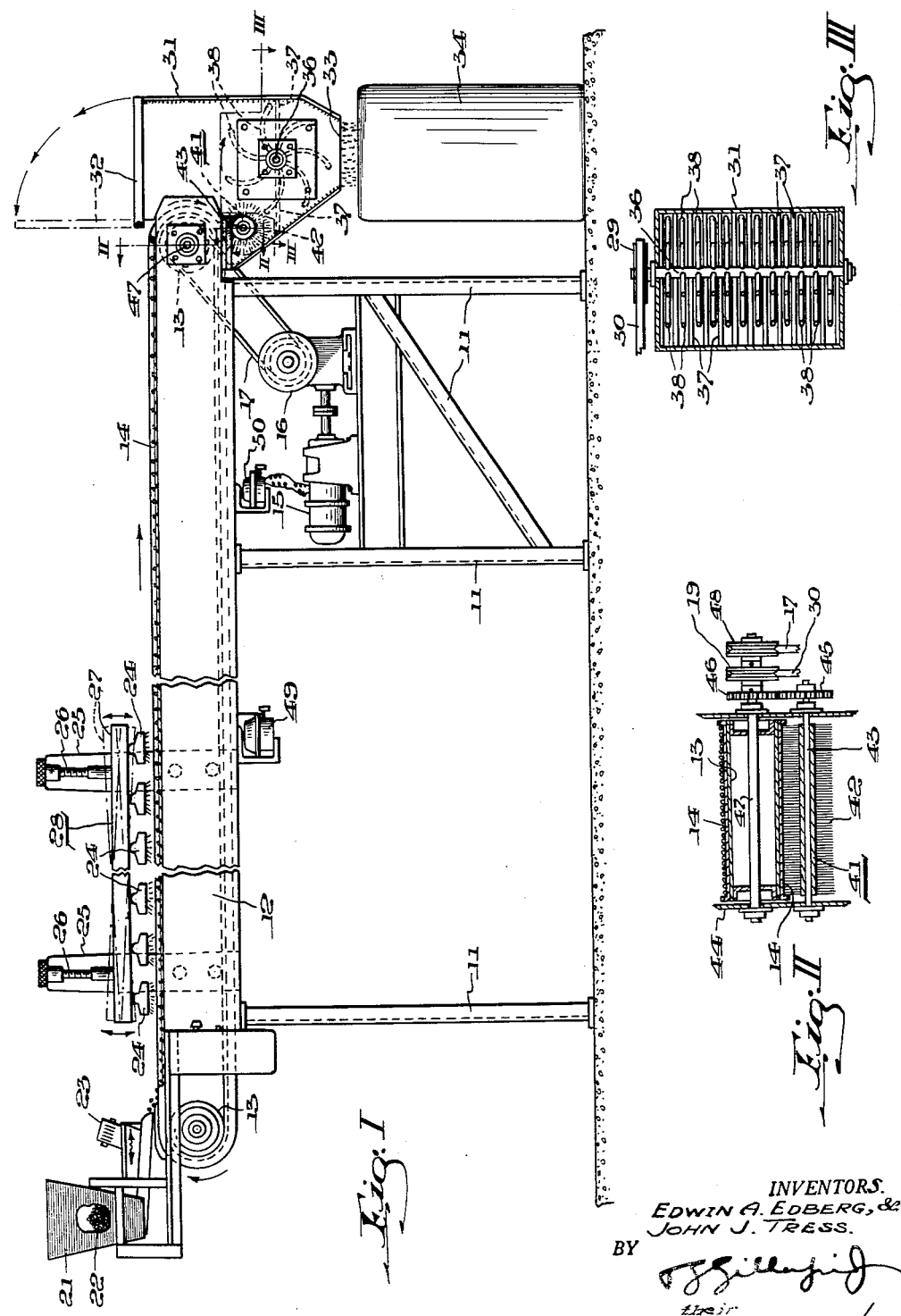
INVENTORS.
EDWIN A. EDBERG, &
JOHN J. TRESS.
BY
their ATTORNEY.

3,015,479
MACHINE APPARATUS FOR MANUFACTURE
OF FOAMED POLYSTYRENE
Edwin A. Edberg, Butler, and John J. Tress, Beaver
Falls, Pa., assignors to Koppers Company, Inc., a corporation of Delaware
Filed June 23, 1955, Ser. No. 517,436
6 Claims. (Cl. 263—8)

This application is concerned with a novel apparatus for use in the heat treating of granular materials derived from a source of free flowing expandable beads of thermoplastic material, and more particularly polystyrene material, containing a normally liquid aliphatic hydrocarbon boiling in the range of 30–100° C. so as to be partially expandable to foamed particles capable of further thermal expansion and concomitant coalescence to form integral cellular structures.

The apparatus finds particular utility in the controlled partial expansion of expandable thermoplastic materials to yield foamed particles capable of both further expansion and concomitant coalescence to yield an integral cellular structure and especially in the controlled partial expansion of polystyrene particles having integrated therewith an aliphatic hydrocarbon boiling in the range 35–100° C.

The apparatus of this invention comprises in one embodiment in combination an endless belt disposed in a substantially horizontal plane, means positioned at the feed end of said belt for disposing granular material evenly thereon; a plurality of infrared lamps adjustably disposed above said belt to heat said granular material thereon; a hopper embracing the discharge end of said belt; a tedder-wheel and screen cooperatively positioned in said hopper adapted to break up and discharge in granular form material received from said belt by said hopper; a cylindrical-shaped brush rotatable in a direction opposite the movement of said belt and positioned in said hopper abutting said belt and having its axis of rotation transverse of said belt being adapted to remove material from said belt; and power means for said elements.

Referring to the drawings:
FIGURE I is a side elevation view of an embodiment of this invention;
FIGURE II is a section taken along the lines II—II in FIGURE I;
FIGURE III is a sectional view taken along the line III—III in FIGURE I.

Referring to the drawings:
The members 11 support the frame 12 on which are mounted the rotatable cylinders 13 which support and move the endless belt 14. The motor 15 and gear reduction unit 16 cooperate with a drive belt 17 to provide power for rotation of the cylinders 13. Positioned adjacent to the feed end of the machine is the hopper 21 which contains the expandable thermoplastic material 22 which is fed onto the belt 14 through an adjustable gate (not shown) at the bottom of the hopper 21 which is actuated by the vibratory means 23.

Positioned above the endless belt 14 is a bank 28 of infrared lamps 24 attached by conventional means to the bank support member 27. The bank 28 is adjustably supported by the threaded rodlike adjusting members 26 which are in turn supported by the posts 25 attached to the frame 12 by conventional means. It is to be noted that the posts 25 which carry the adjusting members 26 are positioned at opposite ends of the bank 28. Thus there is provided means of angularly adjusting the position of the bank 28 of infrared lamps 24 with respect to the surface of the endless belt 14 as well as means for adjusting the distance separating said lamps 24 from the surface of said endless belt 14 while retaining the lamps disposed in parallel to the surface of said belt.

At the discharge end of the belt 14 is a hopper 31 having a lid 32 and a discharge opening 33 at the bottom of said hopper. Illustrated also is the container 34 positioned to receive material discharged from said opening 33.

Positioned in the hopper is a tedder-wheel 36 cooperatively positioned with respect to the grate 37 as to break up material discharged into the hopper from the endless belt 14 and to discharge said material in granular form through the discharge opening 33. The positioning of the grate 37 and the tedder-wheel 36 is illustrated in FIGURE III showing the disposition of these elements in the hopper 31. Illustrated also is the pulley 29 providing power to the tedder-wheel. This pulley is driven by the belt 30 which derives power from the pulley 19.

Also positioned in the hopper 31 is the cylindrical-shaped brush 41. As illustrated in FIGURE II, the brush 41 having bristles 42 is positioned on an axle 43 which is journalled in the side 44 of the hopper 31. The axle 43 is caused to rotate by the gear wheel 45 which is powered by the gear wheel 46 which is keyed to the axle 47 of the cylinder 13 journalled in the sides 44 and powered by the pulley 48 and the driving belt 17. It is to be noted that the brush 41 is positioned transversely of and adjacent to the endless belt 14.

As mentioned above the apparatus of this invention finds particular utility in the controlled partial expansion of thermoplastic polymeric materials having integrated therewith a normally liquid aliphatic hydrocarbon boiling in the range 30–100° C. Illustrative of plastic materials suitable for use in a machine of this invention are disclosed in the copending application of G. F. D'Alelio Serial No. 394,230, filed November 24, 1953. Amongst the various materials disclosed in said application the apparatus of this invention finds particular utility with free-flowing expandable polystyrene beads containing petroleum ether produced for example as in Example 1 of that application.

The operation of the apparatus of this invention is illustrated as follows:

Free-flowing expandable polystyrene beads 22 are placed in the hopper 21 and the gate at the bottom of said hopper suitably adjusted. The electric motor 15 acting through the gear reducer 16, the belt drive means 17 and pulley 48, causes the endless belt 14 to move as indicated by the arrows in FIGURE I. The vibrator 23 is actuated causing the beads 22 to drop onto the belt 14 and pass under the infrared lamps 24 which are in a preferred embodiment adjusted to a distance of from approximately 2 to 5 inches above said belt. In passing under the bank 28 of infrared lamps 24 the expandable beads absorb heat and start to expand. As the belt moves from under the bank of lamps 24 the beads continue to expand and as a result of said expansion are cooled and stop expanding. Being thermoplastic the beads have a tendency in the heated condition to coalesce. Upon reaching the discharge end of the belt 14 the partially-expanded beads and clumps of coalesced partially-expanded beads, are discharged into the hopper 31 and fall upon the grate 37. In the event the expanded particles 22 have a tendency because of their thermoplastic nature to stick to the belt 14, the belt, as it rotates at the discharge end around the cylinder 13 contacts the bristles 42 of the brush 41 which is rotating in a direction opposite the direction of the motion of the belt. Thereupon the particles are brushed from the belt and fall onto the grate 37. The tines 38 in cooperation with the grate 37 act upon the material to break it up and cause it to drop in granular form through the grate 37, the discharge opening 33 and into the container 34.

It will be realized that the bank 28 of infrared lamps 24 is illustrative of a source of radiant heat adjustably disposed above, and along the line of travel of, the belt 14. In general the output of the bank 28 should be in the approximate range of 20 to 50 watts per square inch.

It has been observed that at an output of 40 watts per square inch the bank 28 when disposed parallel to the belt 14 at a distance of two and a quarter inches and the belt speed is in the range 100–150 feet per minute, expanded beads of 2 pounds per cubic feet density are obtained. The amount of heat supplied by the infrared lamps 24 is governed by the controller 49 by conventional means.

It will be realized that the apparatus of this invention provides a particularly flexible means of exposing a layer of expandable particles on the belt 14 to a variable heat source. That is the lamp bank 28, by adjustment of both the threadlike adjusting members 26, can be moved any desired distance from the surface of the belt 15 while being maintained parallel thereto. This distance is in general in the range of from two to five inches in the particular embodiment illustrated in the drawings. In that event the same amount of heat is supplied during the entire passage of the belt under the lamp bank 28. On the other hand by means of angular adjustment of the lamp bank 28 there can be supplied to the particles on the belt 14, heat of varying intensity. As illustrated by the dotted lines in FIGURE I the left end of the bank support member 27 can be lowered and the right end raised in which event the heat of greatest intensity is supplied as the beads first come under the bank of lamps 24. On the other hand if it is desired to increase the intensity of the heat as the beads pass under the bank of lamps 24 the left end of the bank support member 27 is raised and the right end lowered. Thus as the expandable beads pass under the bank of lamps 24 they are subjected to heat of increasing intensity.

It will be further realized that the intensity of the heat can be varied by varying the amount of current fed to the infrared lamps as controlled by the control means 49 shown in FIGURE I.

A further means of controlling the amount of heat to which the expandable beads are exposed is found in the adjustment of the speed of the belt 14. As the speed is increased there is of course less time of exposure of the beads to the bank of lamps 24 and a correspondingly lessened exposure to heat. In general the speed of the belt can vary in the range of from approximately 30 feet per minute to about 250 feet per minute as governed by the control means 50 for the motor 15.

It is to be noted that the vibratory feed means (hopper 21 and vibratory means 23) is an important element of the combination of this invention. That is, in order to achieve uniformity of product the material is fed onto the moving belt uniformly distributed in a mono layer. The feed means is able, by adjustment of the frequency of vibration, to compensate for variation in the speed of the belt.

The novel combination of elements illustrated in the apparatus of the present invention provides a means for easily conveniently and economically partially expanding the expandable thermoplastic beads described above. The partial expansion of these beads is particularly desirable in that in the partially expanded condition the beads can be utilized to produce integral cellular thermoplastic objects of shapes not obtainable by use of expandable beads which have not been partially pre-expanded. That is, more complex mold shapes can be uniformly filled utilizing partially expanded beads than with expandable beads which have not been partially expanded.

Additionally, the tedder-wheel grate arrangement as before described provides a means of breaking up the partially expanded beads which have as aforedescribed a tendency to either stick together or stick to the belt. The presence in the combination of this invention of the aforedescribed cylindrical brush positioned in the hopper adjacent the endless belt attends to the material tending to stick to the belt.

The endless belt 14 can be of any suitable material capable of withstanding the continued exposure to the radiant heat; for example, neoprene, Hycar rubber, reinforced silicon rubber, and polymeric fluoroethylene-impregnated glass cloth are suitable materials for the construction of said belt.

While the invention has been described with reference to particular embodiments thereof, it will be understood that in its broadest aspects the invention may be variously embodied within the scope of the invention as set forth herein and in the appended claims.

What is claimed is:

1. A method of partial expansion of thermoplastic material to foamed particles capable of further thermal expansion and concomitant coalescence to form an integral cellular structure, which method comprises: feeding free flowing expandable beads each containing a normally liquid aliphatic hydrocarbon boiling in the range 30–100° C. from a hopper from above onto the upper strand of a horizontal flat endless belt during rotation thereof at a speed between 30 and 250 feet per minute to form a layer of said beads on said belt, subjecting the beads on said belt to the heat of radiant heat rays from a source of from 2 to 5 inches above the belt during its rotation to partially expand the beads into newly formed foamed particles, discharging the foamed beads from the belt at the end of the upper horizontal strand into a hopper, brushing residual adherent foamed beads from the lower strand of the conveyor, and subjecting the foamed beads to clump disintegration action as they pass from the end of the conveyor into the hopper, and recovering the partially expanded foamed beads from said hopper.

2. A method as claimed in claim 1, and in which the free flowing expandable beads supplied by the hopper to the belt conveyor are constituted of polystyrene, and in which the heat of said source of radiant heat rays is infra red ray heat of 40 watts per hour at a distance of two and a quarter inches from the foamed beads on the belt, while they travel at a belt speed across the rays from said source in the range of 100–150 feet per second.

3. An apparatus for partially pre-expanding an expandable thermo-plastic polymeric material in the form of beads having integrated therein a liquid hydrocarbon boiling in the range of 30–100° C., comprising a continuously moving conveyor belt having an upper run and a lower run and including a bead depositing end and a discharge end, means adjacent said depositing end for feeding a single layer of freely separable beads on said conveyor belt, a source of radiant heat selectively spaced above said conveyor belt and located intermediate said feed and discharge ends for heating said layer of beads to the temperature at which beads become partially expanded, a discharge hopper mounted adjacent the discharge end of said conveyor and including means for separating the partially expanded beads which have become thermally adhered during exposure to the radiant heat because of the thermo-plastic characteristic of the material, and power means for said belt and said bead separating means.

4. The apparatus as defined in claim 3 in which said hopper includes a rotatable bristle brush arranged to abut said lower run adjacent said discharge end.

5. The invention as defined in claim 3 in which said feed means comprises a vibratory feeder.

6. The invention as defined in claim 3 in which said bead separating means comprises an open-slotted grate disposed across said hopper and a wheel having a plurality of radially spokes extending through the slots of said grate.

References Cited in the file of this patent

UNITED STATES PATENTS

| 653,312 | Pond | July 10, 1900 |
| 1,508,451 | Gray et al. | Sept. 16, 1924 |
| 1,802,105 | Borton | Apr. 21, 1931 |
| 2,063,792 | Coles et al. | Dec. 8, 1936 |
| 2,360,257 | Muller et al. | Oct. 10, 1944 |
| 2,577,209 | Rios | Dec. 4, 1951 |
| 2,787,809 | Stastny | Apr. 9, 1957 |